United States Patent [19]

Spiegelman

[11] 3,894,998
[45] July 15, 1975

[54] MULTIPLE STAGE REACTOR SYSTEM

[75] Inventor: Phillip P. Spiegelman, Wilmington, Del.

[73] Assignee: E. I. du Pont de Nemours & Co., Wilmington, Del.

[22] Filed: Jan. 11, 1973

[21] Appl. No.: 322,758

[52] U.S. Cl. ...... 260/80.78; 260/88.2 R; 260/94.9 P
[51] Int. Cl. ...................... C08f 15/04; C08f 15/40
[58] Field of Search ........................ 260/80.78, 88.2

[56] References Cited
UNITED STATES PATENTS

| | | |
|---|---|---|
| 3,078,261 | 2/1963 | Wisseroth et al. ................. 260/92.1 |
| 3,523,929 | 8/1970 | Paige et al. ...................... 260/80.78 |
| 3,635,919 | 1/1972 | Goffinet .......................... 260/80.78 |
| 3,681,306 | 8/1972 | Wehner .......................... 260/80.78 |

*Primary Examiner*—Joseph L. Schofer
*Assistant Examiner*—A. L. Clingman

[57] ABSTRACT

Improved reaction system in which the reaction is cooled by vaporization of a volatile component, including at least two reaction vessels and a vapor feedback from a downstream reaction vessel to an upstream reaction vessel.

6 Claims, 2 Drawing Figures

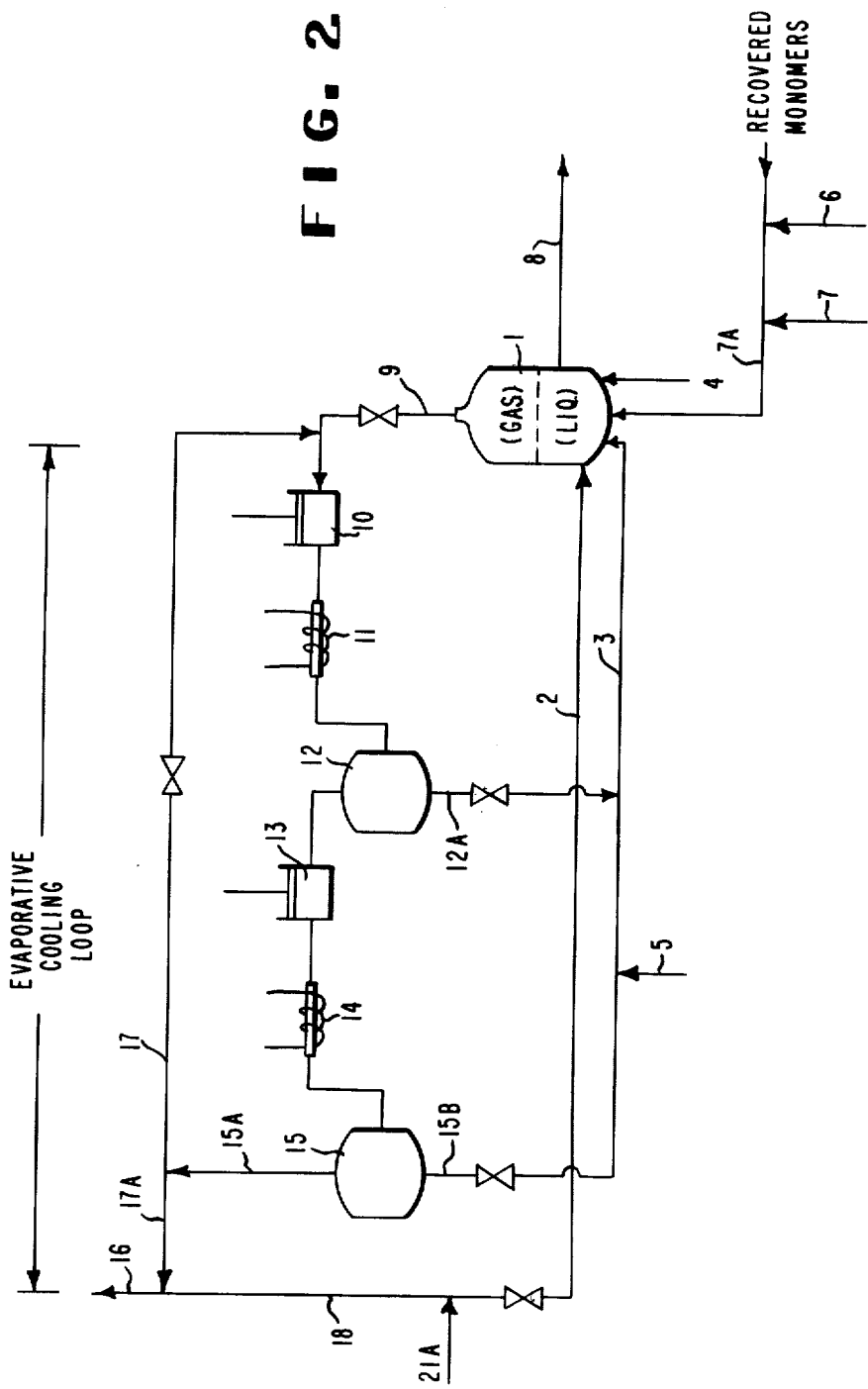

3,894,998

MULTIPLE STAGE REACTOR SYSTEM

BACKGROUND OF THE INVENTION

In certain exothermic chemical reactions, it has previously been found advantageous to use vaporization of the more volatile chemical reactants to remove the heat generated by the reaction. Such a system is described, for example, in U.S. Pat. No. 3,078,261. After vaporization of the reactant, the vapor is condensed for return to the reaction vessel. This type of cooling mechanism is applicable to those reactions which are exothermic and in which at least one reactant is more volatile than the diluent or the products formed.

It is long recognized that increases in reactant concentration in a given reaction will generally result in corresponding increases in the reaction rate. Accordingly, attempts to increase the efficiency of manufacturing operations have included such increased concentrations. Multiple stage reaction systems have been used to take advantage of the benefits of increased concentrations, but the material balance required for the preparation of some products in a continuous closed recycle system cannot be satisfied. This problem is particularly acute in the preparation of copolymers where one monomer is substantially more reactive than the other. In addition, increased concentrations frequently have resulted in larger amounts of unreacted materials that need to be separated from the final product, which tended to counter-balance the beneficial effect of the faster reaction rates.

SUMMARY OF THE INVENTION

The present invention provides an improved polymerization reaction system of the type using vaporization of a reactant to cool the exothermic reaction. This reaction system results in increased catalyst efficiency as well as a marked reduction in the amount of unreacted materials to be separated from the final product.

Specifically, the present invention provides an improvement in a process for bringing together at least two reactants which react exothermically and in which at least one of the reactants is more volatile than the product of the reaction or the diluent, and wherein the reaction is cooled by vaporization of at least one reactant and wherein the vaporized reactant is subsequently condensed and returned to the reaction vessel, the improvement which comprises carrying out the reaction in at least two sequential reactors in which at least about 10 weight percent of the product is formed in each reactor, the improvement further comprising a vapor feedback by which at least a portion of the vaporized reactant from at least one downstream reactor is directly returned to at least one upstream reactor.

BRIEF DESCRIPTION OF THE DRAWINGS

FIG. 2 is a schematic illustration of a single evaporatively cooled reactor.

DETAILED DESCRIPTION OF THE INVENTION

Figure 1:
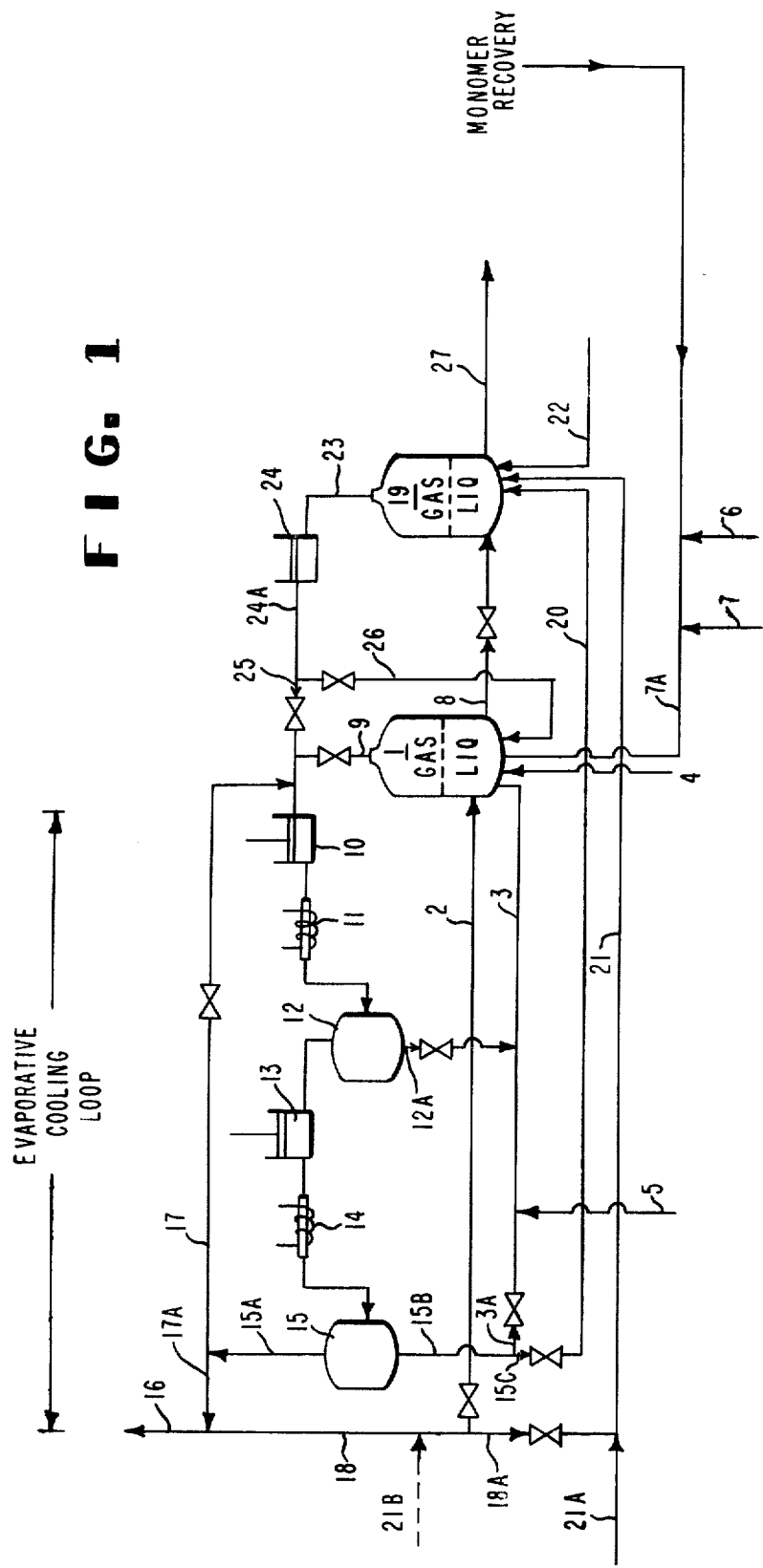
FIG. 1 is a schematic illustration of an apparatus that can be used in the present invention, incorporating two sequentially connected evaporatively cooled reactors with a vapor feedback between the downstream reactor and the upstream reactor.

As indicated previously, evaporatively cooled reaction systems are applicable to exothermic reactions in which at least one of the reactants is more volatile than the diluent or the product formed. The vaporization of such a volatile reactant cools the reaction mixture, after which the vaporized reactant is compressed, condensed and recycled into the reaction mixture. The advantages of the present invention are most fully realized in those reactions in which the specific reaction rates of the volatile components of the reaction differ by at least a factor of two. The term "specific reaction rate" is used in its usual sense to mean the reaction rate constant, that is, the rate of consumption per unit concentration of the reactant. Representative reactions of this type include the formation of ethylene-propylene-1,4-hexadiene terpolymers in hexane; the formation of ethylene-propylene-5-ethylidene-norbornene terpolymers in hexane; and the formation of ethylene-propylene copolymers in hexane. In the latter reaction, the specific reaction rate of ethylene is 10 to 20 times greater than that of propylene. Of these, the preparation of the ethylene-propylene-1,4-hexadiene terpolymer has been found to benefit particularly from the reaction system of the present invention. The solvent used in a particular reaction can, of course, vary widely.

The important features of the present invention are the use of at least two evaporatively cooled reactors in series in which at least about 10 weight percent of the final polymer product is formed in each reactor, and the connection of these reactors by a vapor feedback in which the vapor from at least one downstream reactor is directly returned to at least one upstream reactor.

Such a system is illustrated in FIG. 1, which shows an apparatus arranged for the preparation of ethylene-propylene-1,4-hexadiene terpolymer. The reactants are fed into reactor 1 through conduits 2, 3, 4, and 7A, conduit 3 being supplied through a valve from conduit 3A. The ethylene and propylene reactants fed into the reactor are in part fresh monomer and in part recycled monomer from the reaction system. Fresh ethylene gas is fed into the reactor by conduit 21A connected to the gas recycle stream. Propylene is added to recycle stream 3 by means of conduit 5. The fresh 1,4-hexadiene component is added to the recycle solvent and monomer stream 7A which comprises 1,4-hexadiene, ethylene and propylene recycled from the final product mixture. Fresh hexadiene and hydrogen are fed in through conduits 6 and 7, respectively. A mixture of $VCl_4$/diisobutyl AlCl catalyst, dissolved in recycle solvent, is also fed into the reactor through conduit 4. Product solution stream 8, containing polymer, unreacted monomers, solvent and spent catalyst is removed continuously from reactor 1. A portion of the more volatile components of the reaction mixture is vaporized in the reactor by the heat of polymerization, and is exhausted through stream 9. These vapors are passed through compressor 10 and condenser 11 and to interstage separator 12, where the condensate is removed through conduit 12A and returned through a valve to the reactor by way of conduit 3. The remaining vapor is passed through a compressor 13 and condenser 14 to discharge separator 15. The condensate is removed through conduit 15B and thereafter separated into streams 3A and 15C. These pass, as a vapor liquid mixture, back to reactor 1 and second reactor 19, in conduits 3 and 20, respectively. A portion of the inert gases in the gaseous phase of the discharge separator 15 are released from the system through conduits 15A and 17A to purge 16 preventing build-up of inert gases that enter the system as impurities. Another portion of the gas from the discharge separator is returned to the first compressor 10 by line 17, while the remainder of the gases are returned to the reactors along conduit 18 to feed conduits 2 and 21.

The reaction mixture in reactor 1 containing polymer, unreacted monomers, spent catalysts and a solvent is fed through conduit 8 to second reactor 19. The reaction mixture in the second reactor comprises those reactants passed from the first reactor in addition to recycled reactants and fresh catalyst supplied through conduits 20, 21 and 22, supplying ethylene, propylene and a mixture of catalysts, 1,4-hexadiene and solvent. The gaseous phase from the second reactor is taken off through conduit 23 through a booster compressor 24.

At this point, the gaseous phase of the second reactor enters a significant element of the present invention. While part of the vapor can be recycled by conduit 25 through the condensation apparatus for the first reactor, a portion of the vapor is channeled through conduit 26, designated as the vapor feedback, directly back to the first reactor. The vapor should be returned to the portion of the reactor in which the reaction is taking place, which is generally the liquid phase. The quantity of vapor directed through the vapor feedback is dictated by the material balance of the system resulting from the reactant concentration desired in the two reactors and the rate of reaction. In general, at least about 10 percent of the vapor is fed through the vapor feedback to realize the advantages of the present invention.

The product mixture from the second reactor is taken from the system by outlet 27, after which the polymeric product is separated from unreacted monomers, solvents and spent catalysts.

The process of the present invention permits a variety of advantageous processing conditions. For example, when two reactors are used, the vapor feedback permits a substantially higher concentration of reactants to be used in the first reactor, with a lower concentration in the second reactor, in combination with varying temperature and other reaction conditions. This permits the formation of a final product mixture containing a substantially lower concentration of unreacted monomer than is otherwise possible, facilitating the isolation of products. In addition, the higher monomer concentration in the first reactor results in the increased catalyst efficiency of the present process.

Many variations on the general apparatus scheme outlined above will be evident to those skilled in the art. For example, the points of addition and combination of new and recycled reactants and solvents can be varied. Further, the number of reaction vessels can be increased, in which case the advantages of the invention are realized by providing a vapor feedback from at least one downstream reactor to at least one upstream reactor. For example, if three reaction vessels were used, vapor feedbacks might be provided from the second reaction vessel to the first in combination with a vapor feedback from the third reaction vessel to the second. Alternatively, in this arrangement, vapor feedbacks could extend from the second and third reaction vessels to the first.

The operation and advantages of the present invention are further illustrated by the following specific example.

EXAMPLE

A computer simulation was made of the process performance of the instant invention and compared with the performance of two other reaction systems. The process tested involved the reaction of ethylene, propylene and 1,4-hexadiene to form a terpolymer.

An apparatus of the type illustrated in FIG. 1 is adjusted to produce about 26,000 pounds per hour of a terpolymer containing 63 weight percent ethylene, 33 weight percent propylene and 4 weight percent hexadiene monomer units with a weighted average inherent viscosity of 2.12. The first reactor operates at 18,026 pounds per hour with a residence time of 21 minutes. The polymer produced in this stage, by weight, is 33.2 percent propylene, 3.0 percent hexadiene, and 63.8 percent ethylene, and has an inherent viscosity of 2.21. The second reactor operates at 8,000 pounds per hour with a 21-minute residence time. The polymer produced in the second stage is 33 percent propylene, 5.9 percent hexadiene, and 61.1 percent ethylene. The product has an inherent viscosity of 1.91, measured at 30°C. using a solution of 0.1 gram of copolymer in 100 milliliters of tetrachloroethylene. The operating conditions include a higher reactant concentration in the first reactor than in the second, a temperature 50°C. in the first reaction vessel as opposed to 40°C. in the second reaction vessel, and a hydrogen concentration of 0.00014 mole fraction in the liquid phase of the first reactor and 0.00005 mole fraction in the liquid phase of the second reactor. The remaining operating conditions for the system are indicated in Table I.

The process results in an efficient preparation of terpolymer. The total monomer needed to be recovered from the final product mixture is 1.57 pounds per pound of polymer per hour. The weighted value of the inherent viscosity of the product is 2.12, and the polymer is prepared with an average catalyst efficiency of 75,000 pounds of copolymer per pound mole of vanadium.

The process of the instant invention is compared with a single reactor system as illustrated in FIG. 2. It will be noted that this system is similar to that used in the process of the present invention, except that the second reactor and the associated booster compressor, reactant supply lines and the feedback 26 are not present. This single reactor is operated to produce about 26,000 pounds per hour of a terpolymer having the same percentage composition as that produced in the process of the present invention described above. The total monomer having to be recovered from the final product mixture is 1.79 pounds per pound of copolymer per hour. The terpolymer produced has an inherent viscosity of 1.89 and is produced with a catalyst efficiency of 65,000 pounds of polymer per pound mole vanadium. The remaining process conditions used are as set forth in Table II.

A second comparative process is simulated, using a two-staged reaction system identical to that of the instant invention, except that vapor feedback 26 is absent, and fresh ethylene is supplied through conduit 21B instead of 21A. This process is also operated to produce about 26,000 pounds per hour of a terpolymer having the same composition as before. The first reactor operates at 17,854 pounds per hour, to produce polymer of 61.4 percent ethylene, 34.7 percent propylene and 3.9 percent hexadiene, with an inherent viscosity of 1.82. The second reactor operates at 8,000 pounds per hour to produce polymer of 64 percent ethylene, 32 percent propylene and 4 percent hexadiene, with an inherent viscosity of 1.98. This system is operated at conditions set forth in Table III, with both reactors being operated at 50°C. and a hydrogen concentration of 0.00014 mole fraction in the liquid phase of both reaction vessels. The total amount of monomer needing to be recovered from the product mixture is 1.86 pounds per pound of terpolymer. The weighted average inherent viscosity of the terpolymer obtained from this process is 1.87, obtained with a catalyst efficiency of 64,700 pounds copolymer per pound mole of vanadium.

In operating the three systems, the routine process variables were adjusted to obtain the same polymer composition and rate of production. As can be seen from the above simulated experiments, however, the variation in reaction conditions between the two reactors made possible by the vapor feedback in accordance with the instant invention surprisingly results in several advantages. Because of the higher monomer concentrations possible in the first reactor, the efficiency of the expensive vanadium catalyst obtained in the process of the present invention represents a 14.3 percent increase over the single stage reactor and about 15.9 percent over the two-stage reactor without a vapor feedback. Similarly, the amount of unreacted monomer that must be separated from the final product mixture is substantially lower using the instant process, representing 12.3 percent less than the single reactor system and about 15.6 percent less than that obtained in the two-stage system without a vapor feedback. This result is economically significant because the recycling of volatile reactants requires elaborate compression and condensation equipment. Also significant is the substantial increase in molecular weight of the product as evidenced by the increased inherent viscosity obtained through the use of the present process.

TABLE I

| Line Number | 8 | 21A | 5 | 9 | 12A | 15A | 3A | 17A |
|---|---|---|---|---|---|---|---|---|
| Physical State of Stream (Liquid or Vapor) | L | V | L | V | L | V | L | V |
| Operating Temperature, °C. | 50 | 30 | 35 | 50 | 40 | 40 | 40 | 40 |
| Operating Pressure, Atm. | 14.6 | 21 | 21 | 14.6 | 22.5 | 43.4 | 43.4 | 43.4 |
| Flow Rate, Pounds per Hour | | | | | | | | |
| Ethylene | 5361 | 16588 | | 31762 | 5404 | 20591 | 25163 | 2842 |
| Ethane | 3159 | 6 | 22 | 10981 | 2042 | 4931 | 7559 | 681 |
| Propylene | 66696 | | 9622 | 104759 | 33065 | 25809 | 68008 | 3563 |
| Propane | 10821 | | 206 | 14836 | 5109 | 3450 | 9556 | 479 |
| Hexadiene | 5920 | | | 558 | 605 | 3 | 103 | T |
| Hexane | 129902 | | | 15466 | 15933 | 88 | 2807 | 12 |
| Polymer | 18026 | | | | | | | |
| Nitrogen | 44.4 | | | 1266.8 | 52.9 | 3067.7 | 706.6 | 423.5 |
| Methane | 19.3 | 1 | 1.6 | 324.2 | 21.9 | 467 | 206.5 | 64.5 |
| Hydrogen | 1.0 | | | 82.6 | 2.2 | 288.5 | 35.3 | 42.1 |
| VCl₄ | 43.1D | | | | | | | |
| Dibac | 177.2D | | | | | | | |

| Line Number | 17 | 18 | 16 | 3 | 3 | 2 | 25 |
|---|---|---|---|---|---|---|---|
| Physical State of Stream (Liquid or Vapor) | V | V | V | V | L | V | V |
| Operating Temperature, °C. | 40 | 40 | 40 | 13 | 13 | 6.2 | 68.4 |
| Operating Pressure, Atm. | 43.4 | 43.4 | 43.4 | 15.1 | 15.1 | 14.6 | 16.6 |
| Flow Rate, Pounds per Hour | | | | | | | |
| Ethylene | 17749 | 2727 | 115 | 14584 | 15988 | 1884 | 12893 |
| Ethane | 4250 | 653 | 28 | 3734 | 5889 | 451 | 2680 |
| Propylene | 22246 | 3419 | 144 | 21726 | 38969 | 2363 | 30277 |
| Propane | 2974 | 457 | 19 | 2627 | 12244 | 316 | 4576 |
| Hexadiene | 3 | T | T | 6 | 702 | T | 195 |
| Hexane | 76 | 12 | T | 147 | 18593 | 8 | 4541 |
| Polymer | | | | | | | |
| Nitrogen | 2644.2 | 406.3 | 17.2 | 687.3 | 72.2 | 280.8 | 228.5 |
| Methane | 402.5 | 61.9 | 2.6 | 179.1 | 50.9 | 42.8 | 60.8 |
| Hydrogen | 246.4 | 40.5 | 1.6 | 35.7 | 1.8 | 26.2 | 16.7 |
| VCl₄ | | | | | | | |
| Dibac | | | | | | | |

| Line Number | 15B | 18A | 15C | 21 | 23 | 24A | 26 | 27 |
|---|---|---|---|---|---|---|---|---|
| Physical State of Stream (Liquid or Vapor) | L | L | L | V | V | V | V | L |
| Operating Temperature, °C. | 40 | 40 | 40 | 15.6 | 40 | 68.4 | 68.4 | 40 |
| Operating Pressure, Atm. | 43.4 | 43.4 | 43.4 | 8.95 | 8.95 | 16.6 | 16.6 | 8.95 |
| Flow Rate, Pounds per Hour | | | | | | | | |
| Ethylene | 36409 | 843 | 11246 | 17431 | 26834 | 26834 | 13941 | 2816 |
| Ethane | 10938 | 202 | 3376 | 208 | 5577 | 5577 | 2897 | 1169 |
| Propylene | 98408 | 1056 | 30400 | 1056 | 63015 | 63015 | 32738 | 32497 |
| Propane | 13027 | 141 | 4271 | 141 | 9524 | 9524 | 4948 | 3709 |
| Hexadiene | 148 | T | 45 | T | 405 | 405 | 210 | 5286 |
| Hexane | 4062 | 4 | 1255 | 4 | 9451 | 9431 | 4910 | 126511 |
| Polymer | | | | | | | | 26026 |
| Nitrogen | 1018.9 | 125.5 | 312.3 | 125.5 | 475.7 | 475.7 | 247.2 | 7.2 |
| Methane | 298.6 | 19.1 | 92.1 | 29.1 | 126.5 | 126.5 | 65.7 | 5.0 |
| Hydrogen | 55.0 | 14.3 | 19.7 | 14.3 | 34.7 | 34.7 | 18. | .3 |
| VCl₄ | | | | | | | | 68. D |
| Dibac | | | | | | | | 279.6D |

TABLE I – Continued

| Line Number | 7A | 4 | 22 | 20 | 20 | 6 | 7 |
|---|---|---|---|---|---|---|---|
| Physical State of Stream (Liquid or Vapor) | L | L | L | V | L | L | V |
| Operating Temperature, °C. | −5 | −15 | −15 | −10 | −10 | 30 | 30 |
| Operating Pressure, Atm. | 16.2 | 19 | 19 | 8.95 | 8.95 | 21 | 21 |
| Flow Rate, Pounds per Hour | | | | | | | |
| Ethylene | 2737 | | | 7722 | 2524 | | |
| Ethane | 1169 | | | 1968 | 1411 | | |
| Propylene | 31639 | | | 8993 | 21407 | | |
| Propane | 5558 | | | 1126 | 3145 | | |
| Hexadiene | 5902 | 198 | 198 | T | 45 | 1088 | |
| Hexane | 116909 | 4801 | 4801 | 8 | 1247 | | |
| Polymer | | | | | | | |
| Nitrogen | 23 | .7 | .7 | 3029 | 9.4 | | |
| Methane | 5 | | | 83.9 | 8.2 | | |
| Hydrogen | 1.9 | | | 19.5 | .2 | | 1.6 |
| VCl$_4$ | | 43.1 | 24.9 | | | | |
| Dibac | | 177.2 | 102.4 | | | | |

D - spent catalyst
T - trace

TABLE II

| Line Number | 8 | 21A | 5 | 6 | 7 | 9 | 12A | 15A | 3A | 17A | 17 |
|---|---|---|---|---|---|---|---|---|---|---|---|
| Physical State of Stream (Liquid or Vapor) | L | V | L | L | V | V | L | V | L | V | V |
| Operating Temp., °C. | 50 | 30 | 35 | 30 | 30 | 50 | 50 | 40 | 40 | 40 | 40 |
| Operating Pressure, Atm. | 16 | 21 | 21 | 21 | 15 | 16 | 28.1 | 44.4 | 44.4 | 44.4 | 44.4 |
| Flow Rate, lbs. per Hour | | | | | | | | | | | |
| Ethylene | 3338 | 16638 | | | | 30812 | 1886 | 41323 | 63941 | 14985 | 26838 |
| Ethane | 1894 | 3 | 18 | | | 11312 | 332 | 4872 | 9234 | 1746 | 3126 |
| Propylene | 38604 | | 9573 | | | 120736 | 6085 | 32146 | 103134 | 11517 | 20629 |
| Propane | 5985 | | 205 | | | 16159 | 828 | 3851 | 12951 | 1380 | 2471 |
| Hexadiene | 4684 | | | 1087 | | 587 | 211 | 9 | 373 | 3 | 6 |
| Hexane | 119432 | | | | | 14975 | 5085 | 265 | 9795 | 95 | 170 |
| Polymer | 26600 | | | | | | | | | | |
| Nitrogen | 42.1 | | | | | 2530.1 | 13.9 | 3843.7 | 1139 | 1377.2 | 2466.5 |
| Methane | 17.6 | .8 | 1.4 | | | 451 | 4.6 | 517.4 | 291 | 185.4 | 332 |
| Hydrogen | .8 | | | | .7 | 87.7 | .3 | 165.2 | 28.2 | 59.2 | 106 |
| VCl$_4$ | 76.5 D | | | | | | | | | | |
| Dibac | 314.8 D | | | | | | | | | | |

| Line Number | 18 | 16 | 3 | 3 | 2 | 7A | 4 |
|---|---|---|---|---|---|---|---|
| Physical State of Stream (Liquid or Vapor) | V | V | V | L | V | L | L |
| Operating Temp., °C. | 40 | 40 | 6.2 | 6.2 | 10 | −5 | −15 |
| Operating Pressure, Atm. | 44.4 | 44.4 | 16.4 | 16.4 | 16 | 16 | 18.4 |
| Flow Rate, lbs. per Hour | | | | | | | |
| Ethylene | 14809 | 176 | 36264 | 29563 | 31447 | 3256 | |
| Ethane | 1725 | 21 | 4394 | 5190 | 1728 | 1894 | |
| Propylene | 11382 | 135 | 28572 | 96228 | 11362 | 37746 | |
| Propane | 1364 | 16 | 3057 | 10927 | 1364 | 5796 | |
| Hexadiene | 3 | T | 6 | 678 | 3 | 5351 | 374 |
| Hexane | 94 | 1 | 132 | 14748 | 94 | 109808 | 9625 |
| Polymer | | | | | | | |
| Nitrogen | 1361 | 16.2 | 1072.4 | 80.5 | 1361 | 57 | 1.3 |
| Methane | 183.2 | 2.2 | 245.8 | 51.2 | 184 | 17.6 | |
| Hydrogen | 58.5 | .7 | 27.6 | .9 | 58.5 | .8 | |
| VCl$_4$ | | | | | | | 76.5 |
| Dibac | | | | | | | 314.8 |

D - spent catalyst
T - trace

TABLE III

| Line Number | 8 | 21B | 5 | 6 | 7 | 9 | 12A | 15A |
|---|---|---|---|---|---|---|---|---|
| Physical State of Stream (Liquid or Vapor) | L | V | L | L | V | V | L | V |
| Operating Temperature, °C. | 50 | 30 | 35 | 30 | 30 | 50 | 45 | 40 |
| Operating Pressure, Atm. | 12.4 | 21 | 21 | 21 | 15 | 12.4 | 20.7 | 41.4 |
| Flow Rate, Pounds per Hour | | | | | | | | |
| Ethylene | 3660 | 16276 | | | | 18507 | 3410 | 11888 |
| Ethane | 1349 | 4 | 15 | | | 4191 | 666 | 1931 |
| Propylene | 46157 | | 9752 | | | 64308 | 17887 | 16276 |
| Propane | 9237 | | 198 | | | 11190 | 3465 | 2691 |
| Hexadiene | 5185 | | | 1063 | | 396 | 540 | 3 |
| Hexane | 117859 | | | | | 9266 | 12795 | 78 |
| Polymer | 17854 | | | | | | | |
| Nitrogen | 21.2 | | | | | 737.5 | 17.3 | 1548.5 |
| Methane | 6.4 | .5 | .8 | | | 96.3 | 4.4 | 135.3 |
| Hydrogen | 1.1 | | | | 2.1 | 77.3 | 1.1 | 220.6 |
| VCl$_4$ | 55.1D | | | | | | | |
| Dibac | 226.6D | | | | | | | |

TABLE III—Continued

| Line Number | 3A | 17A | 17 | 18 | 16 | 3 | 3 |
|---|---|---|---|---|---|---|---|
| Physical State of Stream (Liquid or Vapor) | L | V | V | V | V | V | L |
| Operating Temperature, °C. | 40 | 40 | 40 | 40 | 40 | 12 | 16 |
| Operating Pressure, Atm. | 41.4 | 41.4 | 41.4 | 41.4 | 41.4 | 12.9 | 12.4 |
| Flow Rate, Pounds per Hour | | | | | | | |
| Ethylene | 15303 | 4052 | 7836 | 3937 | 115 | 9241 | 8472 |
| Ethane | 3237 | 676 | 1305 | 657 | 19 | 1670 | 2248 |
| Propylene | 46750 | 5548 | 10728 | 5391 | 157 | 16174 | 5821 |
| Propane | 8163 | 917 | 1774 | 891 | 26 | 2307 | 9519 |
| Hexadiene | 111 | 1 | 2 | 1 | T | 6 | 645 |
| Hexane | 2776 | 27 | 51 | 26 | 1 | 127 | 15444 |
| Polymer | | | | | | | |
| Nitrogen | 393 | 527.9 | 1020.6 | 512.9 | 15 | 379.5 | 30.8 |
| Methane | 64.3 | 46.4 | 88.9 | 45.1 | 1.3 | 56.3 | 13.2 |
| Hydrogen | 29 | 75.2 | 145.4 | 73.1 | 2.1 | 29 | 1.1 |
| VCl₄ | | | | | | | |
| Dibac | | | | | | | |

| Line Number | 2 | 15B | 15C | 21 | 23 | 24A | 27 |
|---|---|---|---|---|---|---|---|
| Physical State of Stream (Liquid or Vapor) | V | L | L | V | V | V | L |
| Operating Temperature, °C. | 16 | 40 | 40 | 15.5 | 50 | 58 | 50 |
| Operating Pressure, Atm. | 12.4 | 41.4 | 41.4 | 12.2 | 12.2 | 14.4 | 12.2 |
| Flow Rate, Pounds per Hour | | | | | | | |
| Ethylene | 12036 | 33203 | 17960 | 3177 | 21158 | 21158 | 3458 |
| Ethane | 394 | 7020 | 3583 | 267 | 4171 | 4171 | 1230 |
| Propylene | 3210 | 101426 | 54676 | 2181 | 60553 | 60553 | 39902 |
| Propane | 530 | 17711 | 9537 | 361 | 10903 | 10963 | 3242 |
| Hexadiene | 1 | 240 | 129 | T | 385 | 385 | 4807 |
| Hexane | 16 | 6021 | 3245 | 10 | 9577 | 9577 | 116340 |
| Polymer | | | | | | | 25854 |
| Nitrogen | 318.9 | 782.6 | 389.6 | 194 | 590.3 | 590.3 | 15.2 |
| Methane | 28 | 132.9 | 68.6 | 17.6 | 87.4 | 87.4 | 5.2 |
| Hydrogen | 45.4 | 59.5 | 30.5 | 27.7 | 58.5 | 58.5 | .8 |
| VCl₄ | | | | | | | 77.3D |
| Dibac | | | | | | | 317.9D |

| Line Number | 7A | 4 | 22 | 20 | 20 |
|---|---|---|---|---|---|
| Physical State of Stream (Liquid or Vapor) | L | L | L | V | L |
| Operating Temperature, °C. | −15 | −15 | −15 | 2.8 | 2.8 |
| Operating Pressure, Atm. | 12.4 | 16.9 | 16.9 | 12.2 | 12.2 |
| Flow Rate, Pounds per Hour | | | | | |
| Ethylene | 3374 | | | 10391 | 7509 |
| Ethane | 1230 | | | 1819 | 1964 |
| Propylene | 39070 | | | 13313 | 41363 |
| Propane | 8070 | | | 2084 | 7453 |
| Hexadiene | 5424 | 197 | 197 | 1 | 128 |
| Hexane | 1067366 | 4802 | 4802 | 24 | 3221 |
| Polymer | | | | | |
| Nitrogen | 28.8 | .7 | .7 | 367.3 | 22.3 |
| Methane | 5.2 | | | 58.4 | 10.2 |
| Hydrogen | 2.9 | | | 29.7 | .8 |
| VCl₄ | | 55.1 | 22.2 | | |
| Dibac | | 2266 | 91.3 | | |

D - spent catalyst
T - trace

I claim:

1. In the process for bringing together in a copolymerization reaction at least two reactants which react exothermically and in which at least one of the reactants is more volatile than the product of the reaction or the diluent, and wherein the reaction is cooled by vaporization of at least one reactant and wherein the vaporized reactant is subsequently condensed and returned to the reaction vessel, the improvement which comprises carrying out the reaction in at least two sequential reactors that are evaporatively cooled and in which at least about 10 weight percent of the product is formed in each reactor, the concentration of reactants in the first reactor vessel being higher than that in the second reaction vessel, the improvement further comprising a vapor feedback by which at least a portion of the vaporized reactant from at least one evaporatively cooled downstream reactor is directly returned as vapor to at least one evaporatively cooled upstream reactor.

2. A process of claim 1 wherein the reaction is carried out in two sequential reactors.

3. A process of claim 1 in which the reaction is carried out in three sequential reactors, and wherein a vapor feedback extends from the second reactor to the first and a vapor feedback extends from the third reactor to the second.

4. A process of claim 1 wherein at least about 10 weight percent of the vapor from the downstream reactors is directly returned to at least one upstream reactor by at least one vapor feedback.

5. A process of claim 1 wherein the specific reaction rate of at least one volatile reactant in the reaction is at least twice the specific reaction rate of a second volatile reactant.

6. A process of claim 4 wherein the reactants ethylene and propylene are polymerzied.

* * * * *